United States Patent
Brandon et al.

(10) Patent No.: US 11,795,322 B2
(45) Date of Patent: Oct. 24, 2023

(54) HEAT SHRINKABLE FILM, AND CONTAINER WITH FILM

(71) Applicant: Bonset America Corporation, Browns Summit, NC (US)

(72) Inventors: Matthew Vincent Brandon, Browns Summit, NC (US); Ebonii Nicole Neal, Browns Summit, NC (US); Victoria Marie Moncada Meeks, Browns Summit, NC (US)

(73) Assignee: BONSET AMERICA CORPORATION, Browns Summit, NC (US)

( * ) Notice: Subject to any disclaimer, the term of this patent is extended or adjusted under 35 U.S.C. 154(b) by 154 days.

(21) Appl. No.: 17/136,865

(22) Filed: Dec. 29, 2020

(65) Prior Publication Data

US 2022/0204751 A1 Jun. 30, 2022

(51) Int. Cl.
*C08L 67/02* (2006.01)
*C08J 5/18* (2006.01)

(52) U.S. Cl.
CPC .............. *C08L 67/02* (2013.01); *C08J 5/18* (2013.01); *C08J 2300/12* (2013.01); *C08J 2367/02* (2013.01); *C08L 2205/025* (2013.01)

(58) Field of Classification Search
None
See application file for complete search history.

(56) References Cited

U.S. PATENT DOCUMENTS

| 4,310,584 | A | * | 1/1982 | Cooper | B32B 7/023 |
| | | | | | 428/483 |
| 6,271,291 | B1 | * | 8/2001 | McWilliams | C08K 5/19 |
| | | | | | 524/236 |
| 2019/0389188 | A1 | * | 12/2019 | Forloni | B32B 7/04 |
| 2020/0282688 | A1 | * | 9/2020 | Schurr | B32B 3/266 |

FOREIGN PATENT DOCUMENTS

| EP | 1833886 | * | 1/2011 |
| JP | 2005-171180 A | | 6/2005 |
| JP | 2011079229 | * | 4/2011 |
| JP | 2012224666 | * | 11/2012 |

OTHER PUBLICATIONS

Eastman Technical Data Sheet for Embrace High Yield HY1000 (2022) pp. 1-2. (Year: 2022).*
Eastman Upmold,com Eastar Copolyester 6763 (2012) pp. 1-10. (Year: 2012).*

* cited by examiner

*Primary Examiner* — David J Buttner
(74) *Attorney, Agent, or Firm* — Honigman LLP

(57) ABSTRACT

The present invention provides a heat shrinkable film which is capable of replacing polyvinyl chloride-based heat shrinkable films, exhibits appropriate rigidity and appropriate shrinkage force, and is excellent in stability during storage, The heat shrinkable film including a polyester resin A having a glass transition temperature of 65° C. or higher, and a polyester resin B having a glass transition temperature higher than the glass transition temperature of the polyester resin A by 10° C. or more, wherein a content of the polyester resin B is from 5 to 25% by mass with respect to 100% by mass of the heat shrinkable film, and a thickness is 25 μm or more and less than 80 μm.

2 Claims, 2 Drawing Sheets

FIG. 1

|  | Ex. 1 | Ex. 2 | Ex. 3 | Ex. 4 |
|---|---|---|---|---|
| RESIN MIXTURE COMPOSITION | | | | |
| POLYESTER RESIN A | 89 | 79 | 79 | 79 |
| POLYESTER RESIN B | 10 | 20 | 20 | 20 |
| ABA | 1 | 1 | 1 | 1 |
| PVC | – | – | – | – |
| FILM PROPERTY VALUES AND CHARACTERISTICS | | | | |
| THICKNESS (μm) | 50 | 50 | 30 | 70 |
| THERMAL SHRINKAGE RATE (70°C) | 19 | 13 | 13 | 13 |
| THERMAL SHRINKAGE RATE (80°C) | 51 | 47 | 47 | 47 |
| THERMAL SHRINKAGE RATE (90°C) | 70 | 68 | 68 | 68 |
| THERMAL SHRINKAGE RATE (100°C) | 74 | 73 | 73 | 73 |
| NATURAL SHRINKAGE RATE | 0.38 | 0.38 | 0.38 | 0.38 |
| RING CRUSH VALUE | 7.00 | 7.10 | 3.6 | 15.90 |
| SHRINKAGE FORCE | 6.00 | 5.93 | 2.95 | 9.35 |

FIG. 2

|  | Comp. Ex. 1 | Comp. Ex. 2 | Comp. Ex. 3 | Comp. Ex. 4 | Comp. Ex. 5 |
|---|---|---|---|---|---|
| RESIN MIXTURE COMPOSITION | | | | | |
| POLYESTER RESIN A | 99 | 69 | – | 79 | 79 |
| POLYESTER RESIN B | – | 30 | – | 20 | 20 |
| ABA | 1 | 1 | – | 1 | 1 |
| PVC | – | – | 100 | – | – |
| FILM PROPERTY VALUES AND CHARACTERISTICS | | | | | |
| THICKNESS (μm) | 50 | 50 | 50 | 20 | 80 |
| THERMAL SHRINKAGE RATE (70°C) | 25 | 9 | 27 | 13 | 13 |
| THERMAL SHRINKAGE RATE (80°C) | 53 | 42 | 51 | 47 | 47 |
| THERMAL SHRINKAGE RATE (90°C) | 70 | 64 | 58 | 68 | 68 |
| THERMAL SHRINKAGE RATE (100°C) | 75 | 72 | 61 | 73 | 73 |
| NATURAL SHRINKAGE RATE | 0.53 | 0.38 | 1.90 | 0.38 | 0.38 |
| RING CRUSH VALUE | 7.60 | 7.20 | 8.50 | 2.5 | 22.88 |
| SHRINKAGE FORCE | 6.08 | 5.90 | 4.30 | 1.36 | 10.89 |

HEAT SHRINKABLE FILM, AND CONTAINER WITH FILM

BACKGROUND OF THE INVENTION

Field of the Invention

The present invention relates to a heat shrinkable film, and a container with a film.

Description of the Related Art

Heat shrinkable films are known as labels for containers such as bottles. Those composed of various materials have been proposed as heat shrinkable films. For example, polyvinyl chloride-based heat shrinkable films, styrene-based heat shrinkable films, polyolefin-based heat shrinkable films, polyester-based heat shrinkable films, and the like can be mentioned (Patent Document 1).

These heat shrinkable films are used for different purposes in consideration of shrinkage characteristics and chemical characteristics, depending on the shape of the container to be applied and the contents of the container. Among these, polyvinyl chloride-based heat shrinkable films have specific heat shrinkability. Polyvinyl chloride-based heat shrinkable films have conventionally been used for various applications because of their specific heat shrinkability.

On the other hand, in recent years, heat shrinkable films which are alternatives to polyvinyl chloride-based heat shrinkable films have been studied from the growing interest in environmental issues. Therefore, it is desired to apply heat shrinkable films obtained from materials other than polyvinyl chloride to various applications to which polyvinyl chloride-based heat shrinkable films have conventionally been applied.

PRIOR ART DOCUMENTS

Patent Document

Patent Document 1: Japanese Unexamined Patent Application, First Publication No. 2005-171180

SUMMARY OF THE INVENTION

Problems to be Solved by the Invention

However, the heat shrinkability of the polyester-based heat shrinkable film described in Patent Document 1 is different from the heat shrinkability of polyvinyl chloride-based heat shrinkable films. For this reason, the polyester-based heat shrinkable film described in Patent Document 1 is not suitable for the applications to which polyvinyl chloride-based heat shrinkable films have conventionally been applied. Therefore, it is difficult to replace polyvinyl chloride-based heat shrinkable films with the polyester-based heat shrinkable film described in Patent Document 1.

In addition, the heat shrinkable film is required to have appropriate rigidity and appropriate shrinkage force in consideration of attachment to a container, and stability during storage (that is, small change in size during storage).

The present invention provides a heat shrinkable film which is capable of replacing polyvinyl chloride-based heat shrinkable films, exhibits appropriate rigidity and appropriate shrinkage force, and is excellent in stability during storage.

Means for Solving the Problem

The present invention includes the following aspects.

[1] A heat shrinkable film including a polyester resin A having a glass transition temperature of 65° C. or higher, and a polyester resin B having a glass transition temperature higher than the glass transition temperature of the aforementioned polyester resin A by 10° C. or more, wherein a content of the aforementioned polyester resin B is from 5 to 25% by mass with respect to 100% by mass of the heat shrinkable film, and a thickness is 25 μm or more and less than 80 μm.

[2] The heat shrinkable film according to [1], wherein the aforementioned polyester resin A and the aforementioned polyester resin B are both amorphous polyesters.

[3] A container with a film, including: a container body; and the heat shrinkable film of [1] or [2] covering a side surface of the aforementioned container body.

Effects of the Invention

According to the present invention, it is possible to provide a heat shrinkable film which is capable of replacing polyvinyl chloride-based heat shrinkable films, exhibits appropriate rigidity and appropriate shrinkage force, and is excellent in stability during storage.

BRIEF DESCRIPTION OF THE DRAWINGS

FIG. 1 shows compositions of resin mixtures of Examples 1 to 4 and evaluation results of the property values and characteristics of heat shrinkable films of Examples 1 to 4.

FIG. 2 shows compositions of resin mixtures of Comparative Examples 1 to 5 and evaluation results of the property values and characteristics of heat shrinkable films of Comparative Examples 1 to 5.

DETAILED DESCRIPTION OF THE INVENTION

Figure 3:
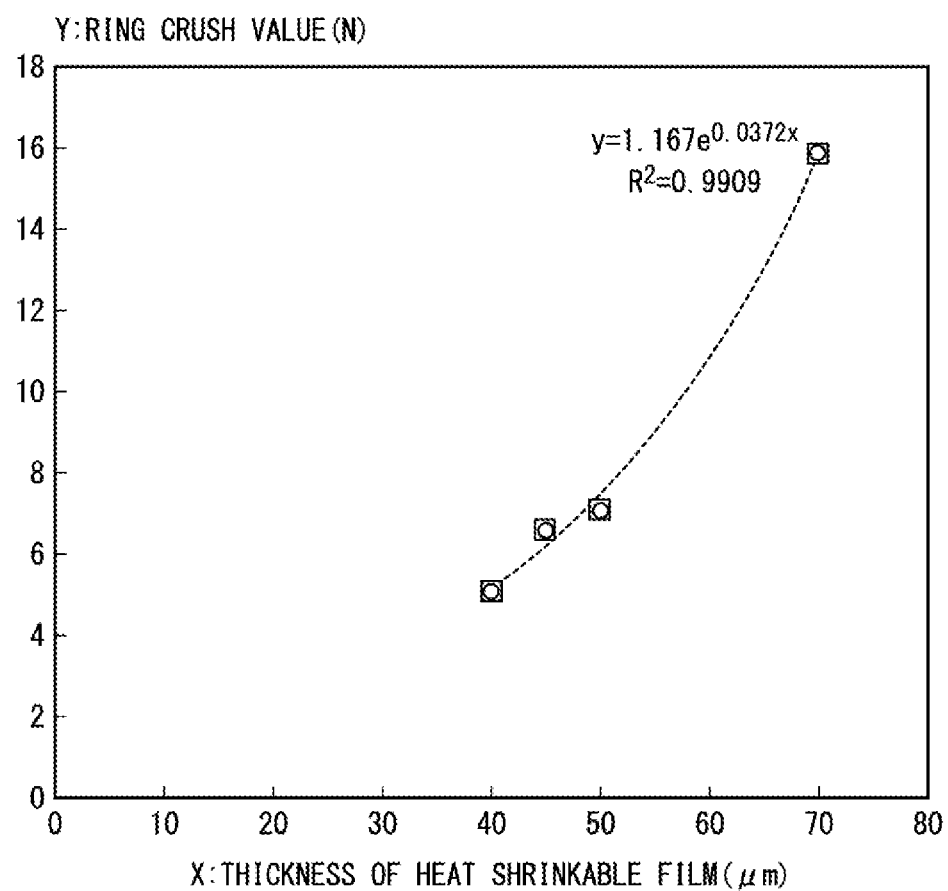
FIG. 3 is a graph showing the relationship between the thicknesses (μm) and ring crush values (N) of the heat shrinkable films of Examples 1 to 4.

Definitions of the following terms apply throughout the present specification and claims.

The "glass transition temperature" is determined by the method described in the examples.

The "natural shrinkage rate" is determined by the method described in the examples.

The "shrinkage force" is determined by the method described in the examples.

The "amorphous polyester" means a polyester resin having no melting point and no endothermic peak observed by a differential scanning calorimeter (DSC).

The symbol "-" indicating a numerical range means that numerical values described before and after that are included as the lower limit value and the upper limit value.

<Heat Shrinkable Film>

The heat shrinkable film of the present invention includes a specific polyester resin A and a specific polyester resin B. The heat shrinkable film of the present invention may further contain another polyester resin other than the polyester resin A and the polyester resin B.

The heat shrinkable film of the present invention may further contain another resin other than the polyester resin, as needed, as long as the effects of the present invention are not impaired.

The heat shrinkable film of the present invention may further contain an additive described later, as needed, as long as the effects of the present invention are not impaired.

The polyester resin A is a polyester resin having a glass transition temperature of 65° C. or higher.

The polyester resin A is selected from polyester resins having a glass transition temperature of 65° C. or higher. Specific examples of the polyester resin A include, for example, Embrace LV Copolyester (manufactured by Eastman Chemical Company, glass transition temperature: 69° C.) and Weezen HS310 (manufactured by Selenis, glass transition temperature: 71° C.). However, the polyester resin A may be a polyester resin having a glass transition temperature of 65° C. or higher, and is not limited to these examples.

The glass transition temperature of the polyester resin A is 65° C. or higher, preferably from 65 to 75° C., more preferably from 66 to 73° C., and still more preferably from 67 to 71° C.

When the glass transition temperature of the polyester resin A is 65° C. or higher, the natural shrinkage rate can be suppressed to a low level. Therefore, the stability during storage of the heat shrinkable film of the present invention is improved.

When the glass transition temperature of the polyester resin A is equal to or less than the upper limit value, the stretchability in the process of producing the heat shrinkable film is improved.

The content of the polyester resin A is preferably from 75 to 95% by mass, more preferably from 77 to 93% by mass, and still more preferably from 79 to 91% by mass with respect to 100% by mass of the heat shrinkable film.

When the content of the polyester resin A with respect to 100% by mass of the heat shrinkable film is equal to or more than the lower limit value, the heat shrinkage performance of the entire heat shrinkable film is unlikely to decrease.

When the content of the polyester resin A with respect to 100% by mass of the heat shrinkable film is equal to or less than the above upper limit value, the thermal shrinkage rate of the heat shrinkable film hardly becomes excessively high, and it becomes easy to replace the characteristics of polyvinyl chloride resins.

The polyester resin B is a polyester resin whose glass transition temperature is 10° C. or more higher than the glass transition temperature of the polyester resin A.

The polyester resin B is selected from polyester resins whose glass transition temperatures are 10° C. or more higher than the glass transition temperature of the polyester resin A.

Specific examples of the polyester resin B include, for example, Easter Copolyester GN001 (manufactured by Eastman Chemical Company), Easter Copolyester 6763 (manufactured by Eastman Chemical Company, glass transition temperature: 80° C.), Easter Copolyester GN071 (manufactured by Eastman Chemical Company, glass transition temperature: 81° C.) and the like. However, the polyester resin B is not limited to these examples.

The glass transition temperature of the polyester resin B is 10° C. or more higher, and preferably 1 PC or more higher, than the glass transition temperature of the polyester resin A.

When the glass transition temperature of the polyester resin B is at least 10° C. or more higher than the glass transition temperature of the polyester resin A, the heat shrinkable film can reproduce the heat shrinkability specific to the polyvinyl chloride-based heat shrinkable film. In addition, the thermal shrinkage rate of the heat shrinkable film does not become excessively high, and the characteristics of polyvinyl chloride resins can be replaced.

The content of the polyester resin B is from 5 to 25% by mass, preferably from 7 to 23% by mass, and more preferably from 9 to 21% by mass with respect to 100% by mass of the heat shrinkable film.

When the content of the polyester resin B is from 5 to 25% by mass with respect to 100% by mass of the heat shrinkable film, the heat shrinkable film can reproduce the heat shrinkability specific to the vinyl chloride-based heat shrinkable film.

In the heat shrinkable film of the present invention, both the polyester resin A and the polyester resin B are preferably amorphous polyesters. When the polyester resin A and the polyester resin B are both amorphous polyesters, it becomes easy to replace the characteristics of the polyvinyl chloride resins.

(Other Resins)

Specific examples of other resins than polyester resins include, for example, an acrylic resin, a polyolefin and an ABS resin. One of these other resin components may be used alone, or two or more of these may be used in combination.

When the heat shrinkable film contains another resin, the content of the another resin is preferably from 1 to 15% by mass, more preferably from 2 to 13% by mass, and still more preferably from 3 to 11% by mass with respect to 100% by mass of the heat shrinkable film. When the content of the other resin is within the above-mentioned numerical range, the decrease in the transparency of the heat shrinkable film due to the difference in the refractive indices of the resins hardly occurs.

(Additive)

Examples of additives include anti-blocking agents, anti-oxidants, weathering stabilizers, antistatic agents, anti-fogging agents, metal soaps, waxes, fungicides, antibacterial agents, nucleating agents, flame retardants and slip agents. Among these, slip agents are preferable because slippage of the surface of the heat shrinkable film is improved, and inorganic slip agents are more preferable as the slip agents.

Specific examples of the inorganic slip agent include, for example, calcium carbonate, silica and glass.

When the heat shrinkable film contains an additive, the content of the additive is preferably from 0.1 to 5% by mass, and more preferably from 0.5 to 3% by mass, with respect to 100% by mass of the heat shrinkable film.

The method of adding the additive is not particularly limited. As the addition method, addition by a master batch is preferable because of simplicity. Specific examples of the master batch include, for example, Anti Blocking agent (contains 20% Silica) (manufactured by Sukano, G dc S559-E). However, specific examples of the master batch are not limited to this example.

The thickness of the heat shrinkable film is 25 μm or more and less than 80 μm, preferably from 30 to 75 μm, and more preferably from 35 to 70 μm. When the thickness of the heat shrinkable film is 25 μm or more, the rigidity of the heat shrinkable film is sufficient, and when a sleeve produced from the heat shrinkable film is mounted onto a container, mounting failures hardly occur.

When the thickness of the heat shrinkable film is less than 80 μm, the shrinkage force of the heat shrinkable film is unlikely to be excessively strong, and when attached to a container, deformation of the container is unlikely to occur.

The natural shrinkage rate of the heat shrinkable film is preferably 2% or less, more preferably 1% or less, and still more preferably 0.5% or less. When the natural shrinkage rate of the heat shrinkable film is equal to or less than the upper limit value, it means that the dimensional stability of the heat shrinkable film is high, and the stability in the subsequent printing process and the solvent sealing process is improved.

The shrinkage force of the heat shrinkable film is preferably from 1.5 to 10.5 N/mm, more preferably from 1.7 to 10.3 N/mm, and still more preferably from 2.0 to 10.0 N/mm. If the shrinkage force of the heat shrinkable film is within the above numerical range, when the heat shrinkable film is used as a label of a container, appropriate adhesion can be obtained.

The ring crush value of the heat shrinkable film is preferably from 2.6 to 18.0 N, more preferably from 2.8 to 17.0 N, and still more preferably from 3.0 to 16.0 N.

When the ring crush value of the heat shrinkable film is within the above-mentioned numerical range, the rigidity of the heat shrinkable film of the present invention is appropriate.

The heat shrinkable film of the present invention may be a single layer film or a multilayer film.

The heat shrinkable film of the present invention may have a functional layer for imparting various functions as needed, as long as the effects of the present invention are not impaired. Examples of the functional layer include, for example, a coating layer for imparting surface lubricity, stain resistance, weather resistance or the like, a transfer layer, or a print layer for imparting design properties.

The heat shrinkable film of the present invention can be produced, for example, by melt-extruding a resin mixture containing a polyester resin A and a polyester resin B to obtain a sheet and then stretching the sheet in the main shrinkage direction.

If necessary, the resin mixture may contain a polyester resin other than the polyester resin A and the polyester resin B, another resin other than the polyester resin, and an additive. The resin mixture can be prepared, for example, by mixing a master batch containing the polyester resin A with a master batch containing the polyester resin B.

As a melt-extrusion method of the resin mixture, a T-die method, an inflation method, a casting method and the like can be mentioned.

Examples of the stretching treatment method for developing the shrinkability include an inflation method, a roll stretching method, a tenter stretching method and a combination thereof. Among these, in view of productivity, it is preferable to form a sheet by a casting method and to stretch by a combination of a roll stretching method and a tenter stretching method.

It is preferable to heat an original film at the time of stretching. The heating temperature may be, for example, from 80 to 100° C.

The stretching magnification is preferably from 3 to 8 times, and more preferably from 4 to 6 times in the main stretching direction (usually, in the width direction (lateral direction) of the original film).

Various coating treatments may be applied for the purpose of modifying the surface of the heat shrinkable film according to the present invention.

As a coating agent, a surfactant for improving slipperiness, a primer agent for improving printability, and the like are generally used.

(Mechanism of Action)

The heat shrinkable film of the present invention described above includes the polyester resin A and the polyester resin B, and the content of the polyester resin B is from 5 to 25% by mass. Therefore, as shown in the examples described later, this film has similar heat shrinkage characteristics to the vinyl chloride based heat shrinkable film, and be able to substitute for the vinyl chloride-based heat shrinkable film.

Since the heat shrinkable film of the present invention contains the polyester resin B having a glass transition temperature higher than that of the polyester resin A by 10° C. or more, this film's natural shrinkage rate is low and the stability of this film during storage is improved.

The heat shrinkable film of the present invention has a thickness of 25 μm or more and less than 80 μm. Therefore, the rigidity and the shrinkage force are appropriate.

<Container with Film>

The container which is applied the present invention will be described.

The film-attached container of the present aspect includes a container body and a heat shrinkable film covering the side surface of the container body (hereinafter referred to as "covering film"). The covering film is one obtained after the heat shrinkable film of the present invention undergoes thermal shrinkage.

Examples of the container body include a plastic container, a glass container, and the like.

The shape of the container body is not particularly limited as long as it can accommodate the contents, and the contents can be inserted thereinto and removed therefrom. More specifically, bottles, jars, cylinders and the like can be mentioned. Usually, in the container body, an opening for inserting and removing the contents is formed at its upper portion.

The covering film is in close contact with the container body in a removable manner. It is preferable that a plurality of holes be formed in the covering film at regular intervals along the vertical direction of the container body. The holes formed at regular intervals will become easily separable portions, and by cutting off the covering film along the easily separable portions, the covering film in close contact with the container body can be more easily removed from the container body.

The contents accommodated in the container with a film are not particularly limited. For example, beverages, foods, medicines, chemicals and the like can be mentioned.

The film-attached container of the present invention can be produced, for example, by winding a heat shrinkable film around the side surface of the container body and then heating the label to cause thermal shrinkage so as to bring the label into close contact with the container body. It is also possible to adhere and join the ends of the heat shrinkable film of the present invention with each other using a solvent to make the heat shrinkable film into a cylindrical shape in advance, and place the cylindrical heat shrinkable film on the side surface of the container body, followed by heating to cause thermal shrinkage.

EXAMPLES

Hereinafter, the present invention will be described more specifically with reference to examples, but the present invention is not limited by the following description.

<Raw Materials>

Polyester resin A: Embrace LV Copolyester (manufactured by Eastman Chemical Company, glass transition temperature: 69° C., no melting point (amorphous polyethylene terephthalate), density: 1.30 g/cm³).

Polyester resin B: Easter Copolyester GN001 (manufactured by Eastman Chemical Company, glass transition temperature: 80° C., no melting point (amorphous polyethylene terephthalate), density: 1.27 g/cm³).

ABA (Anti Blocking Agent): manufactured by Sukano. G de S559-E (silica content: 20% by mass).

PVC: polyvinyl chloride resin (manufactured by Shintech Inc., density: 1.33 g/cm³).

<Measurement Method>

(Thermal Shrinkage Rate (%))

A sample with a length of 100 mm in the main shrinkage direction of the heat shrinkable film was soaked in water which maintained a designated temperature for 10 seconds, and the change in the film length after heat-treatment was measured. The thermal shrinkage rate (%) was calculated by the following equation (1).

Thermal shrinkage rate (%)={[(100 (mm))−(length of the sample after heat-treatment (mm))]/(100 (mm))}×100     (1)

(Natural Shrinkage Rate (%))

After a sample having a length of 800 mm in the main shrinkage direction of the heat shrinkable film was left to stand at 40° C. for 30 days, the length of the sample was measured and the natural shrinkage rate (%) was calculated by the following equation (2).

Natural shrinkage rate (%)={[(800 (mm))−(length after standing (mm))]/(800 (mm))}×100     (2)

When the natural shrinkage rate was 0.50(%) or less, the stability during storage was judged to be satisfactory.

(Ring Crush Value (N))

The ring crush value was measured under the conditions according to TAPPI T882 using a tensile testing machine (manufactured by Instron).

(Shrinkage Force (N))

The shrinkage force (N) was measured by the following method according to ISO 14616-1997.

For a test piece having a length of 90 mm in the main shrinkage direction and a width of 15 mm, the shrinkage force (N) was obtained by multiplying the shrinkage stress measured at 85° C. and the cross sectional area of the test piece. The cross sectional area of the test piece was a value obtained by multiplying the width (15 mm) of the test piece and the thickness (μm) of the film.

Examples 1 to 4, Comparative Examples 1, 2, 4, 5

The polyester resin A, the polyester resin B, and ABA were kneaded so as to achieve the compositions shown in FIG. 1 and FIG. 2, and resin mixtures of the respective examples were obtained. The resin mixture of each example was supplied to an extruder and coextruded at 260° C. to produce a single layer sheet. The sheet was heated to 90° C. and stretched 4.0 times in the main stretching direction (transversal direction) to obtain a heat shrinkable film of each example. The description "thickness (μm)" in FIG. 1 and FIG. 2 indicates the thickness of the heat shrinkable film obtained from the resin mixture of each example.

Comparative Example 3

The resin mixture of Comparative Example 3 obtained by kneading PVC was supplied to an extruder and co-extruded at 180° C. to produce a single layer sheet. The sheet was heated to 80° C. and stretched 4.0 times in the main stretching direction (transversal direction) to obtain a heat shrinkable film of Comparative Example 3 having a thickness of 50 μm.

For the obtained heat shrinkable films of the respective examples, the property values were measured by the above-mentioned methods, and the characteristics of the heat shrinkable films were evaluated. The results are shown in FIG. 1 and FIG. 2.

The heat shrinkable films of Examples 1 to 4 within the range specified in the present invention all had natural shrinkage rates of 0.50(%) or less, and were excellent in stability during storage. In addition, from the numerical values of thermal shrinkage rates at the respective temperatures (especially the thermal shrinkage rate at 80° C.), it was judged that Examples 1 to 4 have similar heat shrinkage characteristics to vinyl chloride-based heat shrinkable films.

FIG. 3 is a graph showing the relationship between the thicknesses (μm) and ring crush values (N) of the heat shrinkable films of Examples 1 to 4. As shown in FIG. 3, the heat shrinkable films of Examples 1 to 4 had thicknesses within the range specified in the present invention, ring crush values which were all less than 18 (N), and appropriate rigidities.

Figure 4:
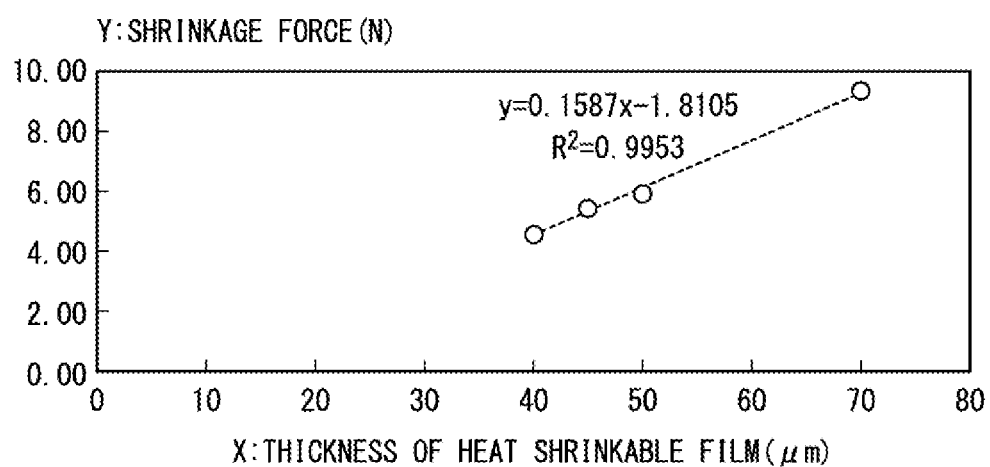
FIG. 4 is a graph showing the relationship between the thicknesses (μm) and shrinkage forces (N) of the heat shrinkable films of Examples 1 to 4.

FIG. 4 is a graph showing the relationship between the thicknesses (μm) and shrinkage forces (N) of the heat shrinkable films of Examples 1 to 4. As shown in FIG. 4, the heat shrinkable films of Examples 1 to 4 had thicknesses within the range specified in the present invention, and appropriate shrinkage forces.

The heat shrinkable film of Comparative Example 1 does not contain the polyester resin B. In this case, the natural shrinkage rate was 0.53%, which was higher than those of the heat shrinkable films of Examples 1 to 4, and the stability during storage was insufficient.

In the heat shrinkable film of Comparative Example 2, the content of the polyester resin B is more than 25% by mass. In this case, from the numerical values of thermal shrinkage rates at the respective temperatures (especially the thermal shrinkage rate at 80° C.), it was judged that Examples 1 to 4 do not have similar heat shrinkage characteristics to vinyl chloride-based heat shrinkable films.

The heat shrinkable film of Comparative Example 3 contains neither the polyester resin A nor the polyester resin B, and contains polyvinyl chloride. In this case, the natural shrinkage rate was 1.9%, which was higher than those of the heat shrinkable films of Examples 1 to 4, and the stability during storage was insufficient.

The heat shrinkable film of Comparative Example 4 has a thickness of 20 μm. In this case, the ring crush value was 2.5 (N), and the shrinkage force was 1.36 (N). As described above, in Comparative Example 4, the rigidity and the shrinkage force were lower than those in the examples, and neither the rigidity nor the shrinkage force was appropriate.

The heat shrinkable film of Comparative Example 5 has a thickness of 80 μm. In this case, the ring crush value was 22.88 (N), and the shrinkage force was 10.89. As described above, in Comparative Example 5, the rigidity and the shrinkage force were higher than those in the examples, and neither the rigidity nor the shrinkage force was appropriate.

What is claimed is:

1. A heat shrinkable film comprising:
   a polyester resin A having a glass transition temperature of 65° C. or higher; and
   a polyester resin B having a glass transition temperature higher than the glass transition temperature of the polyester resin A by 10° C. or more, wherein a content of the polyester resin A is from 77 to 95% by mass with respect to 100% by mass of the heat shrinkable film, wherein a content of the polyester resin B is from 20 to 23% by mass with respect to 100% by mass of the heat shrinkable film, wherein the polyester resin A and the polyester resin B are both amorphous polyesters, a silicon-containing anti blocking agent, a thickness is 25 μm or more and less than 80 μm, wherein the heat shrinkable film has a natural shrinkage rate of 0.5% or less and a thermal shrinkage rate at 80° C. of 47% to 51%, and wherein the heat shrinkable film has a ring crush value of 18 N or less.

2. A container with a film, comprising:

a container body; and the heat shrinkable film according to claim 1 covering side surfaces of the container body.

\* \* \* \* \*